(12) United States Patent  
Maes et al.

(10) Patent No.: US 9,074,704 B2
(45) Date of Patent: Jul. 7, 2015

(54) VALVE WITH SELF-ALIGNING SHAFT SEAL

(75) Inventors: Anton Maes, Avon, OH (US); Brian M. DeBlauw, Sheffield, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 706 days.

(21) Appl. No.: 13/362,091

(22) Filed: Jan. 31, 2012

(65) Prior Publication Data

US 2012/0193561 A1 Aug. 2, 2012

Related U.S. Application Data

(62) Division of application No. 12/061,337, filed on Apr. 2, 2008, now Pat. No. 8,128,062.

(60) Provisional application No. 60/921,952, filed on Apr. 5, 2007, provisional application No. 61/020,186, filed on Jan. 10, 2008.

(51) Int. Cl.
*F16K 41/04* (2006.01)

(52) U.S. Cl.
CPC ........... *F16K 41/04* (2013.01); *Y10T 29/49412* (2015.01)

(58) Field of Classification Search
CPC ..... F16K 5/0694; F16K 41/026; F16K 41/04; F16K 41/046
USPC .................................. 251/214, 356; 277/637
See application file for complete search history.

(56) References Cited

U.S. PATENT DOCUMENTS

| | | | |
|---|---|---|---|
| 841,960 A | 1/1907 | Gray | |
| 1,267,124 A | 5/1918 | Schultes | |
| 1,484,350 A | 2/1924 | Cusick | |
| 3,284,089 A * | 11/1966 | Wrenshall | 277/530 |
| 3,472,483 A | 10/1969 | Janczur | |
| 3,574,311 A | 4/1971 | Fairbanks | |
| 3,602,340 A | 8/1971 | Budzich et al. | |
| 3,675,895 A | 7/1972 | Matousek | |
| 3,912,221 A | 10/1975 | Fenster et al. | |
| 4,726,398 A | 2/1988 | Barree | |
| 4,798,314 A * | 1/1989 | Worth et al. | 222/542 |
| 4,860,784 A | 8/1989 | Petersen et al. | |
| 5,014,999 A | 5/1991 | Makhobey | |
| 5,066,029 A * | 11/1991 | Gill | 277/328 |
| 5,297,777 A | 3/1994 | Yie | |
| 5,590,966 A | 1/1997 | Cherny et al. | |
| 6,497,244 B2 | 12/2002 | Needham | |
| 2005/0230652 A1* | 10/2005 | Anderson et al. | 251/214 |

\* cited by examiner

*Primary Examiner* — Matthew W Jellett

(74) *Attorney, Agent, or Firm* — Renner, Otto, Boisselle & Sklar, LLP

(57) ABSTRACT

A valve design that enables a positive shaft seal to be obtained in an inexpensive manner by reducing the need for close tolerances heretofore required in prior art designs. This unique valve design employs a shaft seal that is adapted for transverse and/or angular movement during assembly of the valve for aligning to the shaft at an alignment position in which it is held after assembly of the valve by a holding device such as a seal nut or spring.

14 Claims, 9 Drawing Sheets

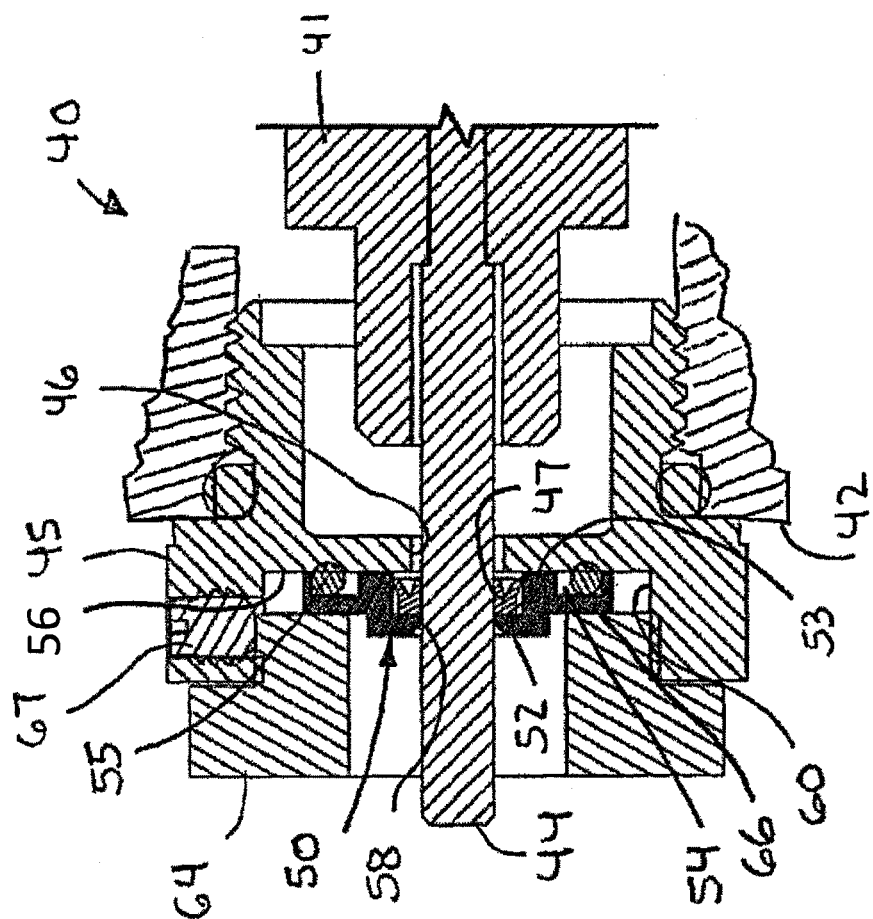
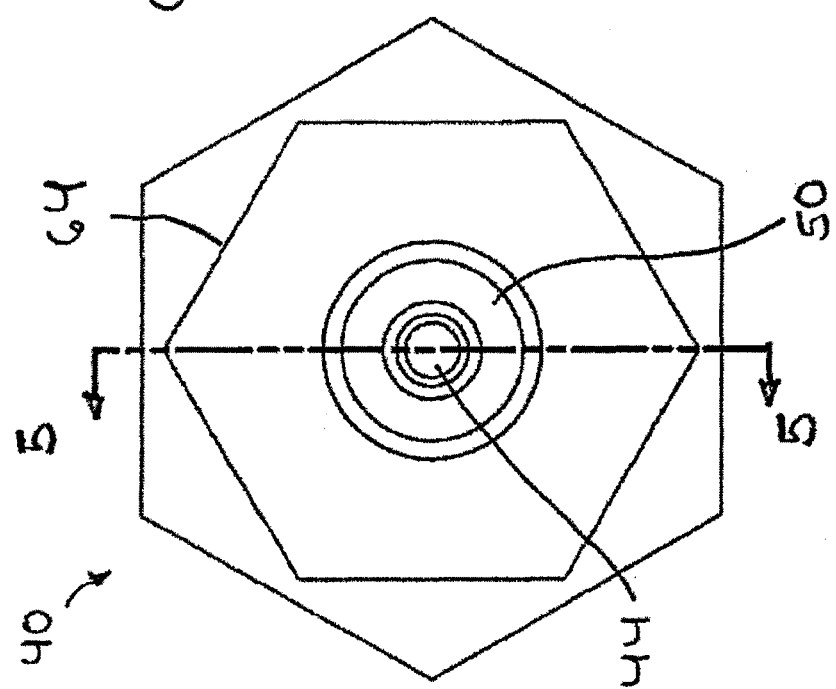
FIG. 5
FIG. 4

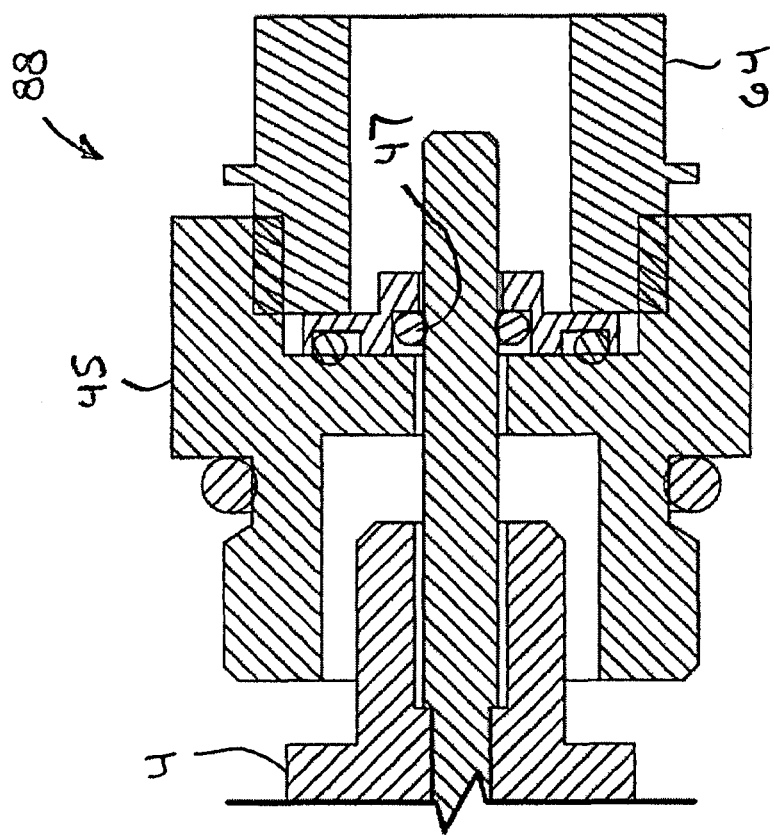
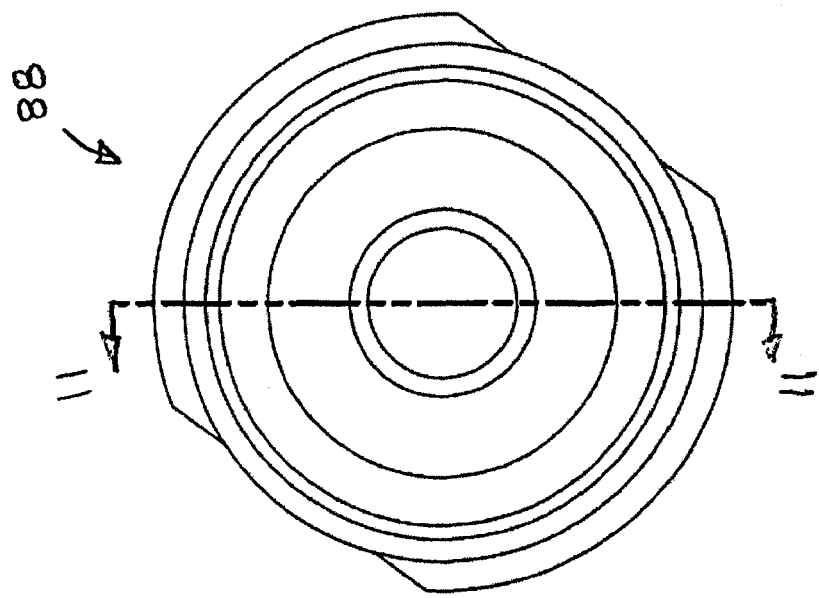
FIG. 11
FIG. 10

VALVE WITH SELF-ALIGNING SHAFT SEAL

RELATED APPLICATION

This application is a divisional application of U.S. application Ser. No. 12/061,337 filed Apr. 2, 2008 now U.S. Pat. No. 8,128,062 which claims the benefit of U.S. Provisional Application No. 60/921,952 filed Apr. 5, 2007 and No. 61/020,186 filed Jan. 10, 2008, all of which are hereby incorporated herein by reference in their entireties.

FIELD OF THE INVENTION

The invention herein described relates generally to valves including a shaft and associated shaft seal, and more particularly to a self-aligning shaft seal for accommodating misalignment of the shaft.

BACKGROUND OF THE INVENTION

Valves have been provided with shafts in various forms for enabling control of a valve element interiorly of a valve body by control devices located exteriorly of the valve body or sensing spool position with a sensor located exteriorly of the valve body. To prevent leakage of fluid along the shaft, various types of shaft seal arrangements have been provided.

FIG. 1 illustrates a portion of a known hydraulic valve 20. The hydraulic valve 20 has a spool 21 that is movable axially through a spool bore 22 for controlling fluid flow through the valve. A shaft 24 is fixedly attached to the spool 21 and extends outside of a valve housing 25. A seal 26 is associated with the shaft 24 so as to prevent fluid migration out of the valve along the shaft. This sealing configuration is often referred to as a fixed seal design, wherein the seal 26 is fixed relative to an adapter 27 that is threadedly received in a threaded bore 28 in the valve housing 25. To ensure proper alignment of the shaft 24 and seal 26 during assembly of the valve, the threads of the housing bore 28 must be aligned concentrically with the spool bore 22. The shaft 24 also must be concentric with the spool 21 and the fixed location of the seal 26 in the adapter 27 must be concentric with the threads of the adapter so that, when the adapter is threadedly connected to the valve housing 25, the seal 26 will be concentric with the shaft 24. All of this alignment or concentricity requires very precise tolerance control of the valve parts. This required precision usually results in high manufacturing costs of the valve parts. When such tolerance control is not achieved, the seal 26 may not properly seal against the shaft 24 and fluid may migrate out of the valve along the shaft.

FIG. 2 illustrates another prior art fixed seal design. The design shown in FIG. 2 is similar to the design of FIG. 1. The difference resides in the spool 21 and shaft 24. In the valve of FIG. 1, threads are used to attach the shaft 24 to the spool 21, whereas in the valve of FIG. 2, a "T" slot 30 is used. The "T" slot allows the shaft 24 to shift transversely relative to the spool 21, but the "T" slot is an expensive feature to add. Again, with the design illustrated in FIG. 2, precision manufacturing is required so as to provide concentricity of the valve parts. Also, in FIG. 2, the seal 26 is located in a defined groove in the adapter 27. This groove is difficult to machine and requires a high precision tolerance.

FIG. 3 shows yet another prior art design that is similar to the design of FIG. 2. In this design the "T" slot 30 is machined into the shaft 24 with the receiver machined in the spool 21. A spring-loaded washer 32 holds the shaft seal 26 in a groove in the adapter 27 that must be machined with high precision. The concentricity issue is not alleviated with this design. The seal groove particularly must be concentric with the threads of the adapter 27 and the valve housing 25. FIG. 3 also shows a shaft control mechanism 33.

SUMMARY OF THE INVENTION

The present invention provides a valve design that enables a positive shaft seal to be obtained in an inexpensive manner by reducing the need for close tolerances heretofore required in prior art designs. This unique valve design employs a shaft seal that is adapted for transverse movement during assembly of the valve for aligning to the shaft at an alignment position in which it is held after assembly of the valve.

Accordingly, the present invention provides a valve comprising a spool movable within a valve body; a shaft associated with the spool and extending out of the valve body; an adapter having a through hole for receiving the shaft; and a shaft seal for sealing against the shaft, wherein the shaft seal is adapted for transverse movement during assembly of the valve for aligning to the shaft at an alignment position and then is held in such alignment position after assembly of the valve.

In a preferred embodiment, the shaft seal is supported by a seal carrier that is transversely movable relative to the shaft during assembly of the valve and then fixed relative to the shaft upon completion of assembly.

The adapter may have a recess for receiving the seal carrier, and the inner transverse dimension of the of the recess may be greater than the outer transverse dimension of the seal carrier to allow for such transverse shifting of the seal carrier during assembly of the valve.

The seal carrier may have a recess for retaining the shaft seal and a carrier seal located radially outwardly of the shaft seal for sealing to the adapter.

The seal carrier may have in an axial end face thereof of an annular groove for retaining the carrier seal, and the carrier seal may form a face seal with an opposing axial surface of the adapter.

The seal carrier may be held in position by a holding device that urges the seal carrier against the opposing axial surface of the adapter. The holding device may be a seal nut that when tightened holds the seal carrier tightly against the opposing axial surface of the adapter to prevent transverse movement of the seal carrier relative to the adapter. In another embodiment, the holding device may be a spring member that resiliently biases the seal carrier against the opposing axial face of the adapter.

The seal carrier and shaft seal may be unitary, with the seal carrier extending radially outwardly from the shaft seal for being held against a surface of the adapter by a holding device. The seal carrier may be made of a sealing material for forming a face seal between opposed axial surfaces of the adapter and the holding device.

In another embodiment, the seal carrier may include a ball and a split ball carrier for receiving the ball, the ball having a through hole through which the shaft extends and a recess in which the shaft seal is retained for sealing to the shaft. The split ball carrier may have axially arranged socket halves between which the ball is held, and the socket halves may be clamped between the adapter and a holding device. A seal may be interposed between at least one of the socket halves and the ball, and at least one of the socket halves may be sealed to the adapter.

The invention also provides a method of assembling a valve, wherein during assembly of the valve a shaft seal is transversely moved in an adapter through which a shaft extends for aligning to the shaft at an aligned position, and then the shaft seal is held in such aligned position after assembly of the valve. Such alignment preferably is effected using a seal carrier that can be shifted transversely and then held in place by a holding device.

Further features of the invention will become apparent from the following detailed description when considered in conjunction with the drawings.

BRIEF DESCRIPTION OF DRAWINGS

In the annexed drawings:

FIG. 4 is an end view of a valve including an shaft seal alignment feature according to the present invention;

FIG. 5 is a fragmentary cross-sectional view of the valve of FIG. 4;

FIG. 10 is an end view of another valve including an shaft seal alignment feature according to the present invention;

FIG. 11 is a fragmentary cross-sectional view of the valve of FIG. 10;

DETAILED DESCRIPTION

Figure 1:
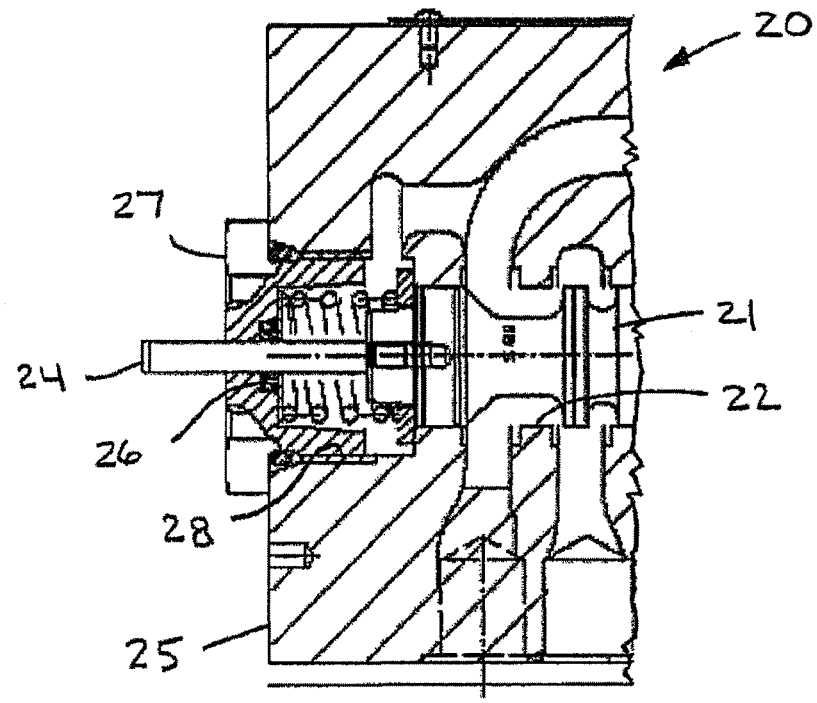
FIG. 1 is a fragmentary cross-sectional view of a prior art valve.
Figure 2:
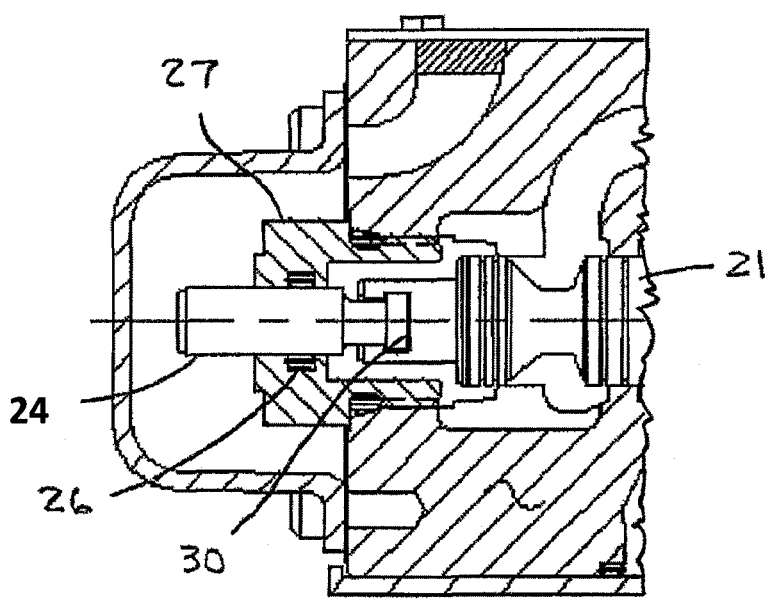
FIG. 2 is a fragmentary cross-sectional view of another prior art valve.

Referring now to the drawings in detail, FIGS. 4-13 illustrate portions of valves constructed in accordance with the present invention. The valves do not require the precise manufacturing tolerances of the prior art valves. Each valve is configured to compensate for non-concentricity of valve parts so that during assembly of the valve, a proper seal is created about a spool shaft.

Referring now in particular to FIGS. 4 and 5, an exemplary valve 40 according to the present invention comprises a spool 41 movable within a valve body 42 (such as a valve housing and the like); a shaft 44 associated with the spool 41 and extending out of the valve body 42; an adapter 45 having an oversized through hole 46 for receiving the shaft; and a shaft seal 47 for sealing against the shaft. As will become apparent from the following description, the shaft seal 47 is adapted for transverse movement during assembly of the valve 40 for aligning to the shaft at an alignment position and then is held in such alignment position after assembly of the valve.

Figure 3:
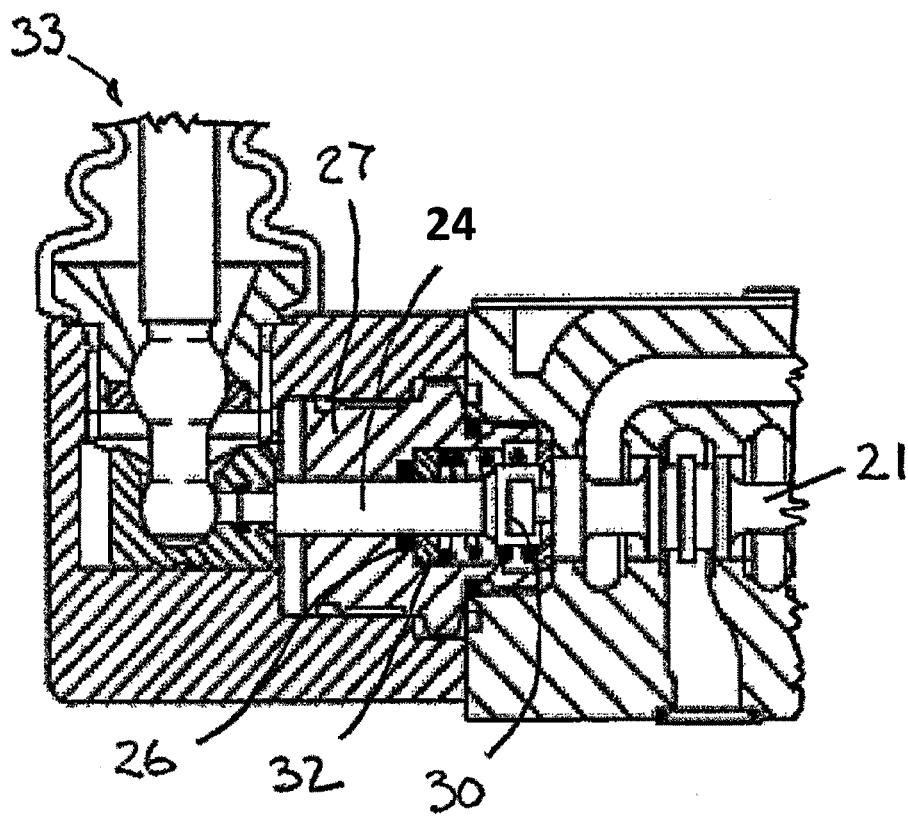
FIG. 3 is a fragmentary cross-sectional view of still another prior art valve.

The spool 41, valve body 42 and shaft 44 can be of any design known in the art presently or in the future. The adapter may be a separate component that is attached to the valve body as by means of a threaded connection, or in some embodiments the adapter may be unitary with the valve body or portion thereof. The term "shaft" is used herein to mean any elongate or axially extending member such as a shaft, rod and the like that extends from a spool or other internal member of the valve and which is movable relative to the valve body to provide a control or other valve function. The shaft, for example, may be connected externally of the valve body to a shaft control mechanism such as shown in FIG. 3, or have associated therewith a sensor.

The shaft seal 47 is supported in a seal carrier 50. More particularly, the seal carrier 50 has a recess 52 at its inner diameter for retaining the shaft seal, which as shown may be a wiper seal. The seal carrier also has in an axial end face 53 thereof a recess 54 for retaining an annular carrier seal 55 radially outwardly of the shaft seal for sealing to the adapter 45. The carrier seal forms a face seal with an opposing axial surface 56 of the adapter.

The seal carrier 50 has a central opening 58 through which the shaft 44 extends and an outer diameter that is smaller than an internal diameter of a recess 60 in the adapter 45. Consequently, the seal carrier can be moved transversely relative to the adapter 45 during assembly to align the shaft seal with the shaft. That is, the seal carrier, along with the shaft seal 47, can move radially, relative to a centerline of the adapter, to properly align the seal concentric with the shaft without requiring concentricity of the shaft and adapter. This enables looser manufacturing tolerances and makes assembly more cost efficient.

After installation and alignment of the shaft seal 47 with the shaft 44, the seal is held in position by a holding device that urges the seal carrier against the opposing axial surface of the adapter 45. In the embodiment shown in FIGS. 4 and 5, the holding device is a seal nut 64 that when tightened holds the seal carrier 50 tightly against the opposing axial surface 56 of the adapter to prevent transverse and axial movement of the seal carrier relative to the adapter. To this end, the seal carrier has a radially outer annular flange portion 66 clamped between the seal nut 64 and an opposing surface of the adapter. The seal nut may be provided with a thread locking feature such as a set screw 67, pin or similar mechanism that positively locks the seal nut in place relative to the adapter.

During assembly of the valve 40, the shaft 44 is inserted into the hole in the adapter 45. The seal carrier 50 is then assembled onto the shaft and pressed up against the adapter. As the seal carrier is slid onto the shaft, the shaft seal will shift transversely as needed to become concentric with the shaft. The seal nut 64 is then tightened to retain the seal carrier in place between the adapter and the seal nut creating a seal between the seal carrier and the adapter and the adapter, seal carrier, and shaft.

Figure 14:
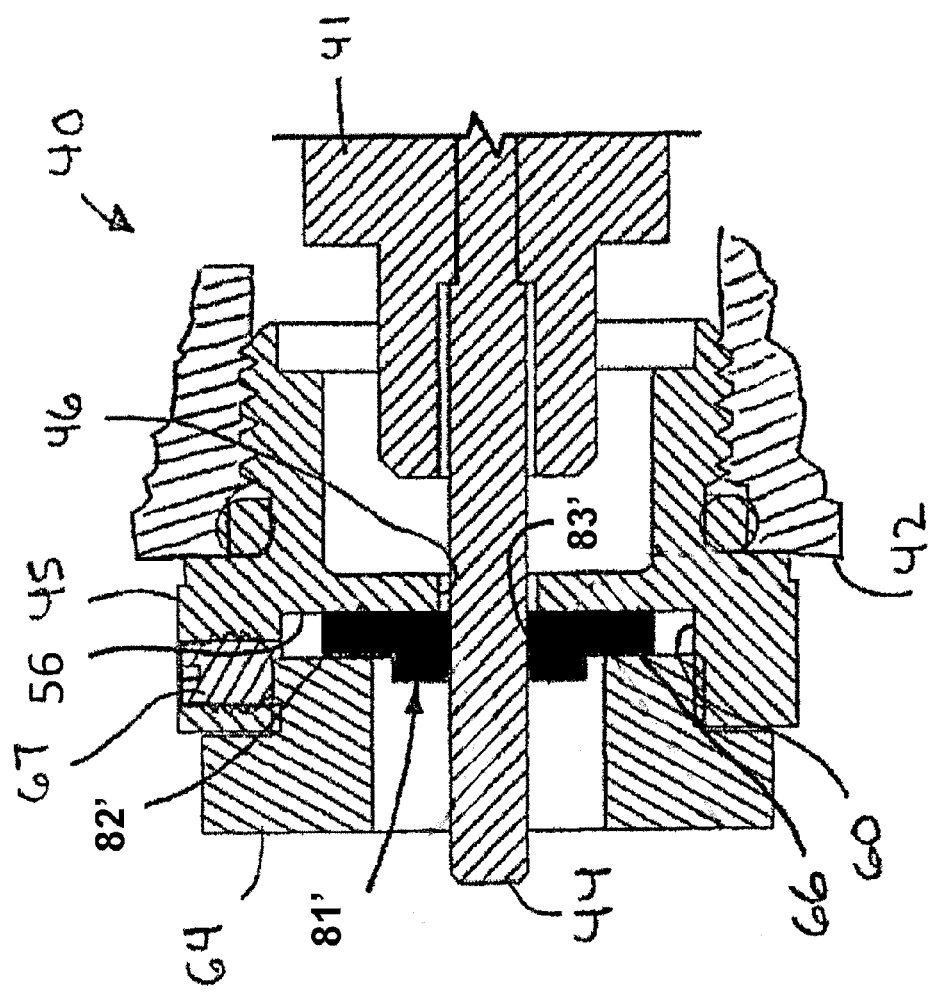
FIG. 14 is the valve of FIG. 5 with a unitary seal carrier as described in FIG. 9.

FIG. 14 shows this same valve with a unitary seal carrier 81'as described below with respect to FIG. 9. Elements of the valve from FIG. 5 are labeled with the same reference numerals as in FIG. 5, and the seal carrier is labeled using the reference numerals of FIG. 9 with a prime designation.

Figure 7:
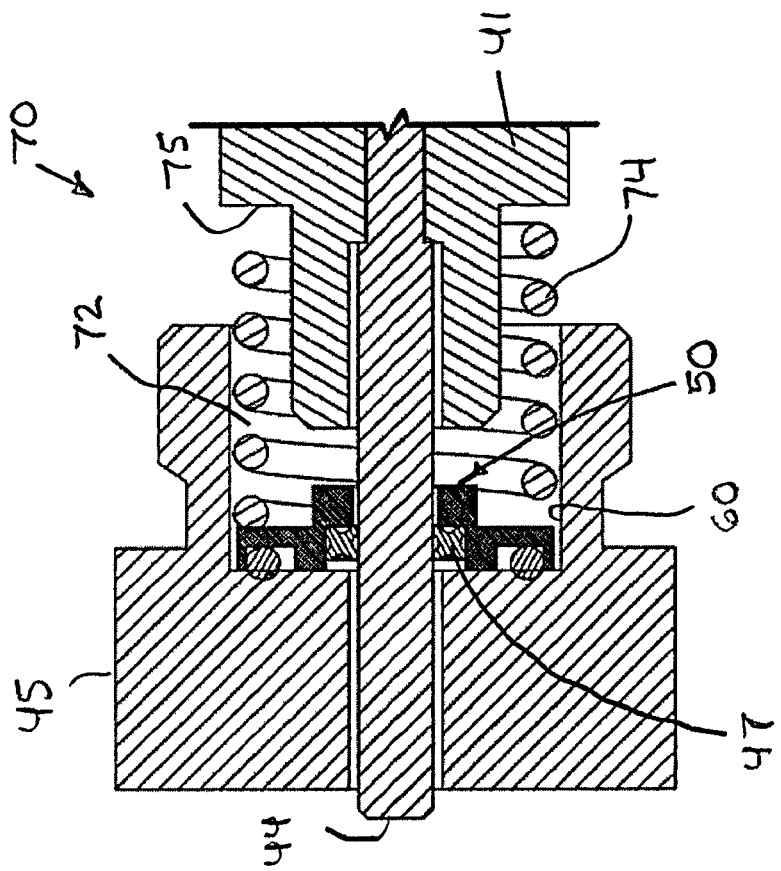
FIG. 7 is a fragmentary cross-sectional view of the valve of FIG. 6.
Figure 6:
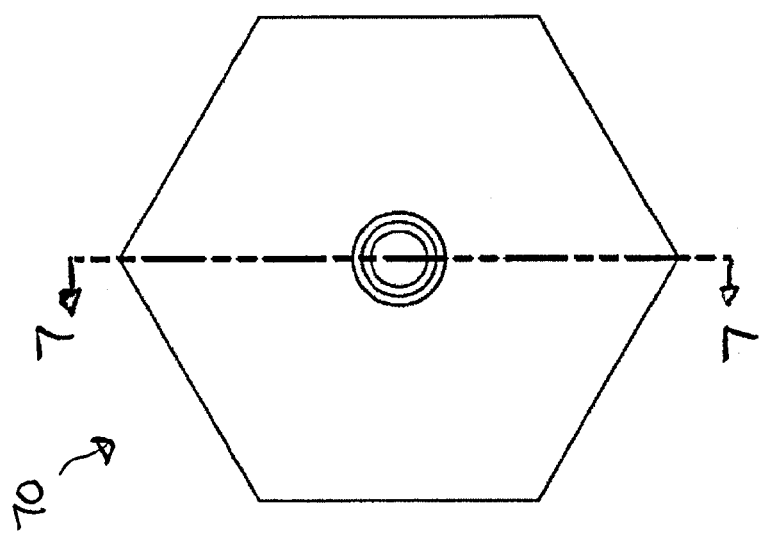
FIG. 6 is an end view of another valve including an shaft seal alignment feature according to the present invention.

FIGS. 6 and 7 show a further embodiment of a valve indicated generally at 70. The valve 70 is substantially the same as the valve 40 except the seal carrier 50 is located on the inside in the fluid containing area 72 of the adapter 45 (i.e., the area nearest the spool 41). In the valve 70, the holding device is a spring 74 that is interposed between the spool 41 and the seal carrier 50. As shown, one end of the spring bears against a shoulder surface 75 on the spool that surrounds the shaft 44 interiorly of the valve body. The spring 74 functions to hold the seal carrier in place. The seal nut and thread locking feature may be eliminated when using the design of FIGS. 6 and 7. The seal carrier will still self-align during assembly.

That is, the seal carrier and thus the shaft seal 47 can shift laterally in the recess 60 (bore) in the adapter 45 during assembly and then be held in place by the spring 74.

Figure 15:
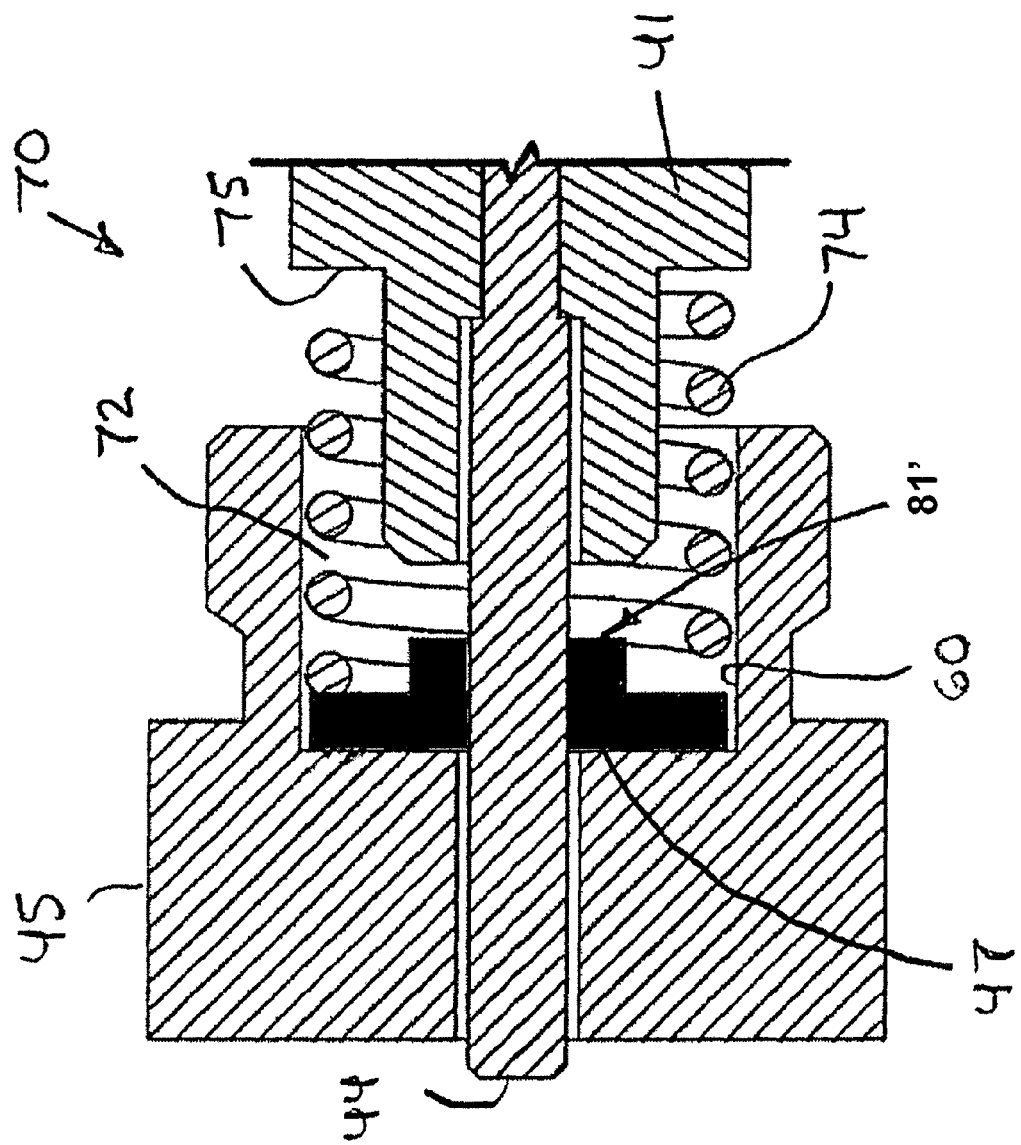
FIG. 15 is the valve of FIG. 7 with a unitary seal carrier as described in FIG. 9.

FIG. 15 shows this same valve with a unitary seal carrier 81' as described below with respect to FIG. 9. Elements of the valve from FIG. 7 are labeled with the same reference numerals as in FIG. 7.

Figure 9:
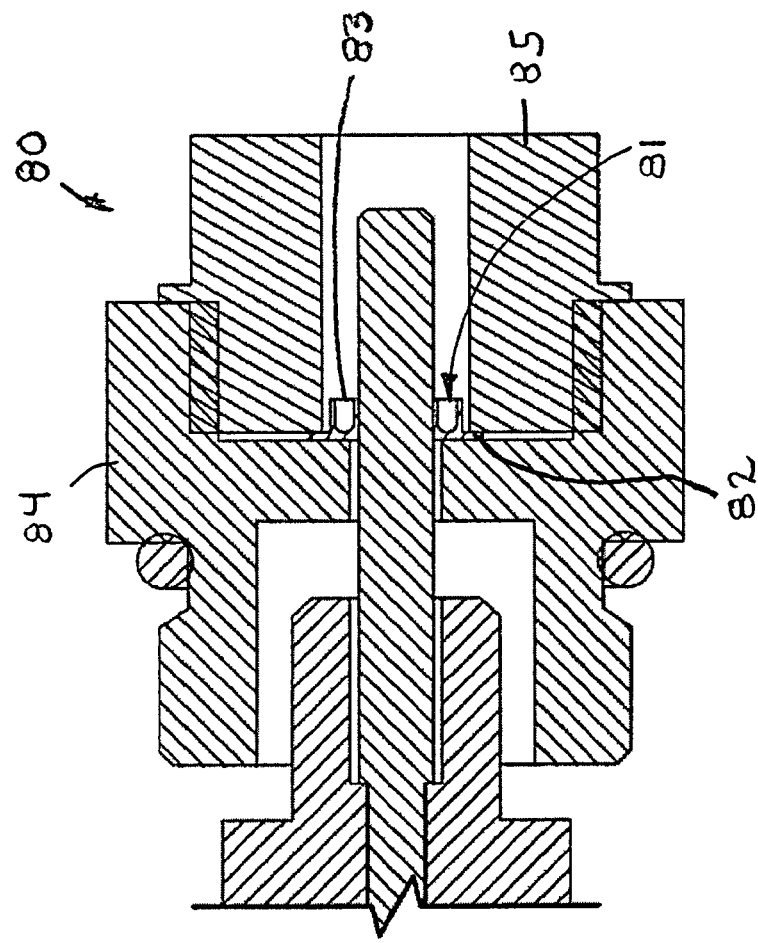
FIG. 9 is a fragmentary cross-sectional view of the valve of FIG. 8.
Figure 8:
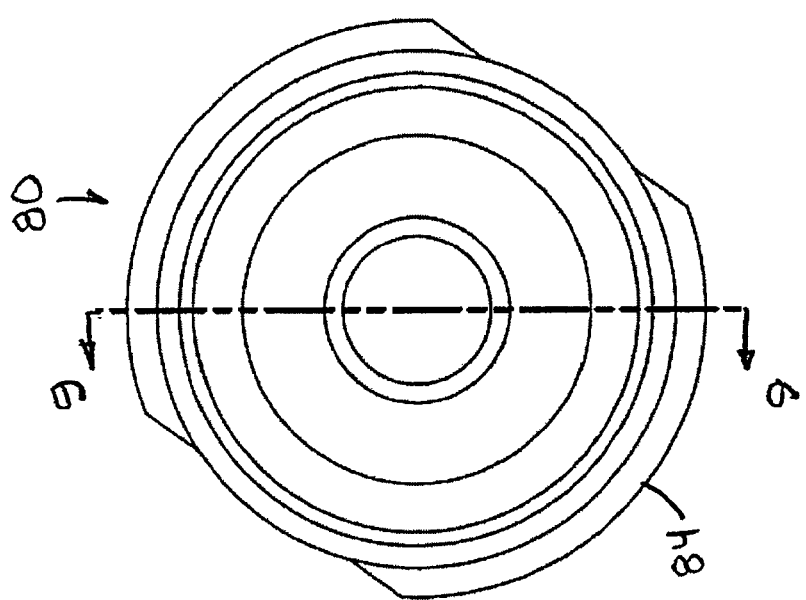
FIG. 8 is an end view of still another valve including an shaft seal alignment feature according to the present invention.

In FIGS. 8 and 9, another embodiment of a valve according to the invention is indicated generally at 80. The valve 80 employs a unitary structure 81 forming a seal carrier 82 and a shaft seal 83. The unitary structure preferably is made of a suitable sealing material as by molding. The seal carrier 82 extends radially outwardly from the shaft seal 83 and forms a face sealing flange that is held against a surface of an adapter 84 by a seal nut 85 or other holding device. As shown, the shaft seal may be a rotary type energized seal.

During assembly, the unitary seal carrier and shaft seal are slipped over the shaft and against an axial face surface of the adapter. The carrier and shaft seal will shift laterally relative to the adapter to align with the shaft. Then the seal nut is tightened to clamp the face sealing flange between an axial end of the seal nut and the axial face surface of the adapter, thereby fixing the shaft seal against radial and axial movement.

FIGS. 10 and 11 show still another embodiment of a valve according to the invention. The valve 88 in these figures is substantially the same as the valve 40 shown in FIGS. 4 and 5, except for the configuration of some components designated by the same reference numbers. In particular, the shaft seal 47 is in the form of an O-ring.

Figure 12:
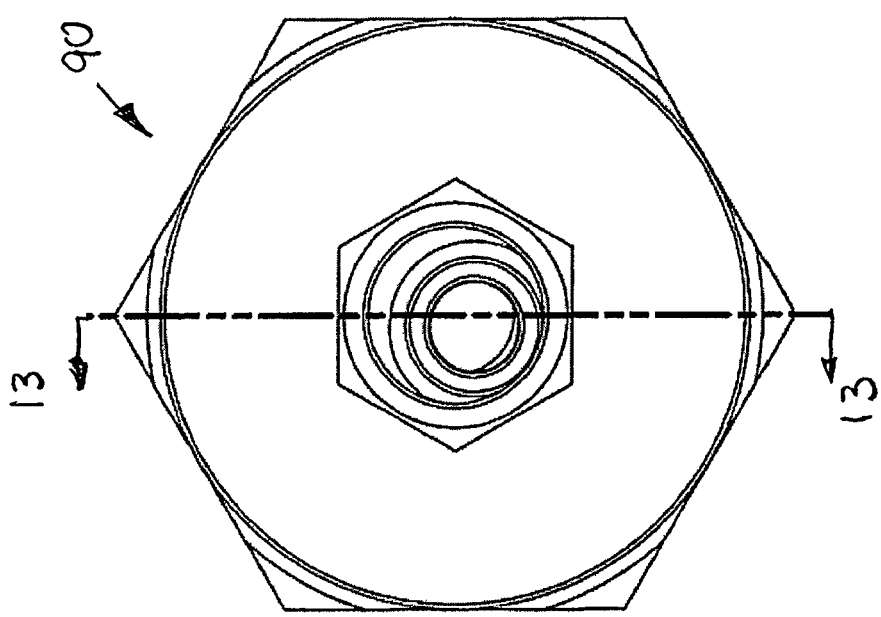
FIG. 12 is an end view of another valve including an shaft seal alignment feature according to the present invention.
Figure 13:
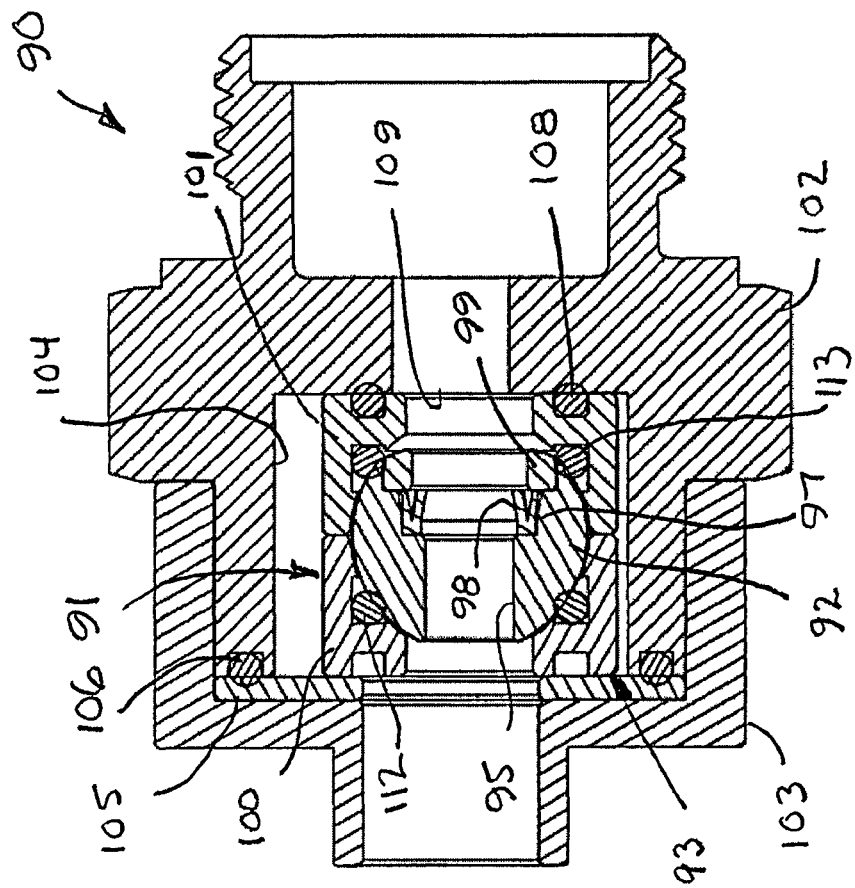
FIG. 13 is a fragmentary cross-sectional view of the valve of FIG. 12.

Referring now to FIGS. 12 and 13, yet another embodiment of a valve according to the invention is indicated at 90. In the valve 90, a seal carrier (or seal carrier assembly) 91 includes a ball 92 and a split ball carrier 93 for receiving the ball. The ball has a through hole 95 through which a shaft (not shown) extends and a recess 97 in which a shaft seal 98 is retained by a seal retainer 99 for sealing to the shaft. The split ball carrier has axially arranged socket halves 100 and 101 between which the ball is held, and the socket halves are clamped between the adapter 102 and a holding device. The illustrated holding device is a seal nut 103 that presses the seal carrier assembly into a counterbore (recess) 104 in the adapter 102. A washer 105 and a clutching O-ring 106, or similarly functioning device, may be provided to prevent the ball carrier from rotating when the seal nut is tightened.

The ball carrier has a face sealing O-ring 108 that prevents oil leakage across the face 109 of the adapter to which a counterbore 104 opens. The ball carrier also holds two circumferential sealing O-rings 112 and 113 which hold the ball and prevent leakage around the outer surface of the ball. The spherical shape of the ball assembly preferably is sized to be large enough so that the O-rings will be compressed by the tightening of the seal nut to close the ball carrier.

The seal carrier assembly, prior to tightening of the seal nut, allows for angular "float" during installation to allow the shaft seal to properly seal against the shaft. The seal carrier assembly also is transversely (laterally) movable in the counterbore 104 of the adapter to provide for radial alignment prior to tightening of the seal nut. Once the shaft seal has been angularly and transversely aligned with the shaft, the seal nut is tightened to hold the shaft seal in its aligned position.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A valve comprising:
a spool axially movable within a valve body;
a shaft associated with the spool and extending out of the valve body;
an adapter having a through hole for receiving the shaft;
a shaft seal for sealing against the shaft, wherein the shaft seal is adapted for transverse movement during assembly of the valve for aligning to the shaft at an alignment position and then is held in such alignment position after assembly of the valve;
a holding device having a cavity for receiving the shaft and the shaft seal; and
a seal carrier for supporting the shaft seal,
wherein the seal carrier and shaft seal are unitary, with the seal carrier extending radially outwardly from the shaft seal and being held against a surface of the adapter by the holding device and sealing thereagainst,
wherein a maximum outer transverse dimension of the shaft seal is less than an inner transverse dimension of the cavity of the holding device at a location transversely concentric the outer transverse dimension of the shaft seal, after assembly of the valve.

2. The valve of claim 1, wherein the adapter has a recess for receiving the seal carrier, and an inner transverse dimension of the recess located transversely concentric an outer transverse dimension of the seal carrier is greater than the outer transverse dimension of the seal carrier to allow for such transverse shifting of the seal carrier during assembly of the valve.

3. The valve of claim 1, wherein the seal carrier forms a face seal with an opposing axial surface of the adapter.

4. The valve of claim 3, wherein the seal carrier is held in position by the holding device that urges the seal carrier against the opposing axial surface of the adapter.

5. The valve of claim 4, wherein the holding device is a seal nut that when tightened holds the seal carrier tightly against the opposing axial surface of the adapter to prevent transverse movement of the seal carrier relative to the adapter.

6. The valve of claim 4, wherein the holding device is a spring member that resiliently biases the seal carrier against the opposing axial face of the adapter.

7. The valve of claim 6, wherein the spring member is interposed between the adapter and a shoulder surface surrounding the shaft interiorly of the valve body.

8. The valve of claim 1, wherein the seal carrier is held in position by a holding device that urges the seal carrier against an opposing surface of the adapter.

9. The valve of claim 8, wherein the holding device is a seal nut that when tightened holds the seal carrier tightly against the opposing surface of the adapter to prevent transverse movement of the seal carrier relative to the adapter.

10. The valve of claim 9, further comprising a locking device for preventing untightening of the seal nut once assembled in place.

11. The valve of claim 9, wherein the seal carrier has an annular portion clamped between the seal nut and opposing surface of the adapter.

12. The valve of claim 1, wherein the seal carrier is made of a sealing material for forming a face seal between opposed axial surfaces of the adapter and the holding device.

13. The valve of claim 1, wherein the shaft seal is a contacting lip seal.

14. The valve of claim 1, wherein the shaft seal is a rotary type energized seal.

* * * * *